US008768078B2

(12) United States Patent
Neubrand (10) Patent No.: US 8,768,078 B2
(45) Date of Patent: Jul. 1, 2014

(54) INTELLIGENT MEDIA DECODING (75) Inventor: Hans-Werner Neubrand, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 945 days.

(21) Appl. No.: 12/793,600

(22) Filed: Jun. 3, 2010

(65) Prior Publication Data

US 2011/0248986 A1 Oct. 13, 2011

Related U.S. Application Data (60) Provisional application No. 61/321,797, filed on Apr. 7, 2010.

(51) Int. Cl.
*G06K 9/36* (2006.01)
*H04B 1/66* (2006.01)
*H04N 5/93* (2006.01)

(52) U.S. Cl.
USPC ............ 382/233; 375/240.25; 386/353

(58) Field of Classification Search
CPC .................................. H04N 7/26335
USPC ...................... 382/233; 375/240.25
See application file for complete search history.

(56) References Cited

U.S. PATENT DOCUMENTS

| 4,891,643 | A | | 1/1990 | Mitchell et al. | |
|---|---|---|---|---|---|
| 5,432,900 | A | * | 7/1995 | Rhodes et al. | 715/202 |
| 5,936,641 | A | | 8/1999 | Jain et al. | |
| 6,151,034 | A | | 11/2000 | Jain et al. | |
| 7,002,992 | B1 | | 2/2006 | Shaffer et al. | |
| 7,373,000 | B2 | * | 5/2008 | Ozawa et al. | 382/232 |
| 7,630,308 | B1 | | 12/2009 | Loher | |
| 8,155,205 | B2 | * | 4/2012 | Jin et al. | 375/240.25 |
| 2009/0060032 | A1 | * | 3/2009 | Schmit et al. | 375/240.01 |
| 2010/0027974 | A1 | | 2/2010 | Ansari | |
| 2010/0098153 | A1 | * | 4/2010 | McCarthy et al. | 375/240.02 |
| 2010/0128778 | A1 | * | 5/2010 | Ji et al. | 375/240.2 |

FOREIGN PATENT DOCUMENTS

JP 2000115277 A * 4/2000

OTHER PUBLICATIONS

"Auto Priority Input Terminal Selection and Auto Decoder Selection," Yamaha Electronics Corporation, 2010, 2 pages, downloaded from http://www.yamaha.com/yec/technology/detail/html?CNTID=202521&CTID=5010160, Feb. 17, 2010.

* cited by examiner

*Primary Examiner* — Anand Bhatnagar
*Assistant Examiner* — Soo Park
(74) *Attorney, Agent, or Firm* — Blakely, Sokoloff, Taylor & Zafman LLP (57) ABSTRACT

A request to decode media data is received from an application running on a computing device. A decoder decision module in media processing software also running on the computing device receives the request and intelligently determines which of a plurality of media decoders to route the media data to for decompression. The plurality of media decoders may include a hardware media decoder and a software media decoder. The decoder decision module may consider a number of factors that may affect the efficiency of the decompression. These factors include the file format of the media data, limitations of the hardware decoder(s), the size of the media data, a state of the requesting application, load balancing considerations, and other factors.

31 Claims, 5 Drawing Sheets

INTELLIGENT MEDIA DECODING

RELATED CASES

This application claims the benefit of U.S. Provisional Application No. 61/321,797, filed on Apr. 7, 2010.

TECHNICAL FIELD

This invention relates to the field of data compression and, in particular, to intelligent media decoding.

BACKGROUND

In modern computing systems which process digital signals including media data, such as electronic image data, there is an increased need to reduce the size of the electronic media representation, particularly for transmission and storage purposes. Accordingly, various image compression and decompression techniques have been developed. A number of such techniques involve linear transformation of the image data, followed by quantization and coding of transform coefficients. In this way, the quantized and coded data may be compressed, transmitted or stored, and subsequently decompressed using an inverse set of operations. The decompression is generally performed by a media decoder.

Media data may be stored using any of a number of known file formats. For example, electronic image data may be stored using JPEG (Joint Photographic Experts Group), PNG (Portable Network Graphics), TIFF (Tagged Image File Format), or other image file formats. A computing system tasked with decoding media data may include a dedicated hardware media decoder capable of decoding media data stored in a particular file format, such as JPEG. Media data stored in file formats for which the computing system does not have hardware support may be decoded using software instructions executed by a processor in the computing system. Generally, in computing systems having a hardware media decoder, it is preferable to use the hardware media decoder to decode the media data if possible because of enhanced performance characteristics, including the speed of the decompression process.

In a computing system, an application running on the computing system may make a request to decode a piece of media data. The application specifies how the media data should be decoded and the computing system relies on the request to determine whether to use a hardware media decoder or to decode the media data using software. Conventional computing systems do not have the capability to intelligently optimize the media data decompression based on various factors that may affect the efficiency of the decompression.

SUMMARY

Embodiments are described to intelligently decode media data. In one embodiment, a request to decode media data is received from an application running on a computing device. The request may include an indication from the application that a decoder decision process should be executed by a decoder decision module to determine which of a plurality of media decoders should be used to decode the media data. The decoder decision module may be a piece of media processing software also running on the computing device. The decoder decision module receives the request and intelligently determines which of a plurality of media decoders to route the media data to for decompression. The plurality of media decoders may include a hardware media decoder and a software media decoder. The software media decoder can be supported by software plug-ins that can provide support to decode additional formats (e.g., those formats not supported by the hardware decoder(s)). The decoder decision module may consider a number of factors that may affect the efficiency of the decompression. These factors include the file format of the media data, limitations of the hardware decoder(s), the size of the media data, a state of the requesting application (e.g., foreground or background), load balancing considerations, and other factors. If the media data to be decoded is compatible with the characteristics of an available hardware media decoder, the decoder decision module routes the media data to the hardware media decoder if a hardware media decoder is selected. The software media decoder is used to decode any other media data.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments are described to intelligently decode media data. In one embodiment, a request to decode media data is received from an application running on a computing device. A decoder decision module in media processing software also running on the computing device receives the request and intelligently determines which of a plurality of media decoders to route the media data to for decompression. The plurality of media decoders may include a hardware media decoder and a software media decoder. The decoder decision module may consider a number of factors that may affect the efficiency of the decompression. These factors include the file format of the media data, limitations of the hardware decoder (s), the size of the media data, a state of the requesting application, load balancing considerations, and other factors.

Figure 1:
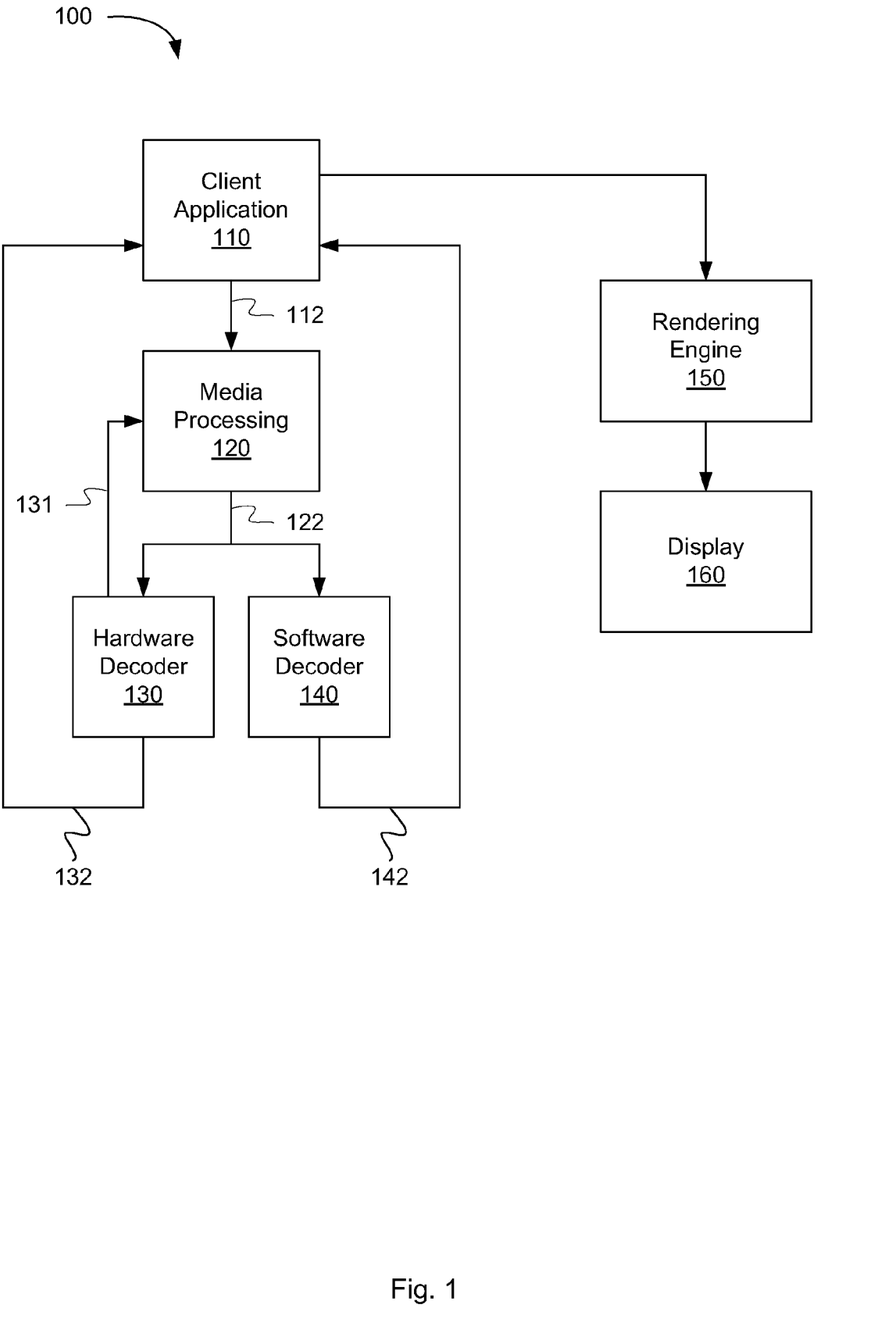
FIG. 1 is a block diagram illustrating the operation of a computing device, according to an embodiment.

FIG. 1 is a block diagram 100 illustrating the operation of a computing device, according to an embodiment. The computing device may be any electronic device that runs software applications derived from stored instructions, such as for example, a personal computer, a server, a smart phone, a media player, an electronic tablet, a game console, an email device, or another device. In one embodiment, the computing device may include client application 110, media processing software 120, hardware media decoder 130 and software media decoder 140.

Figure 4:
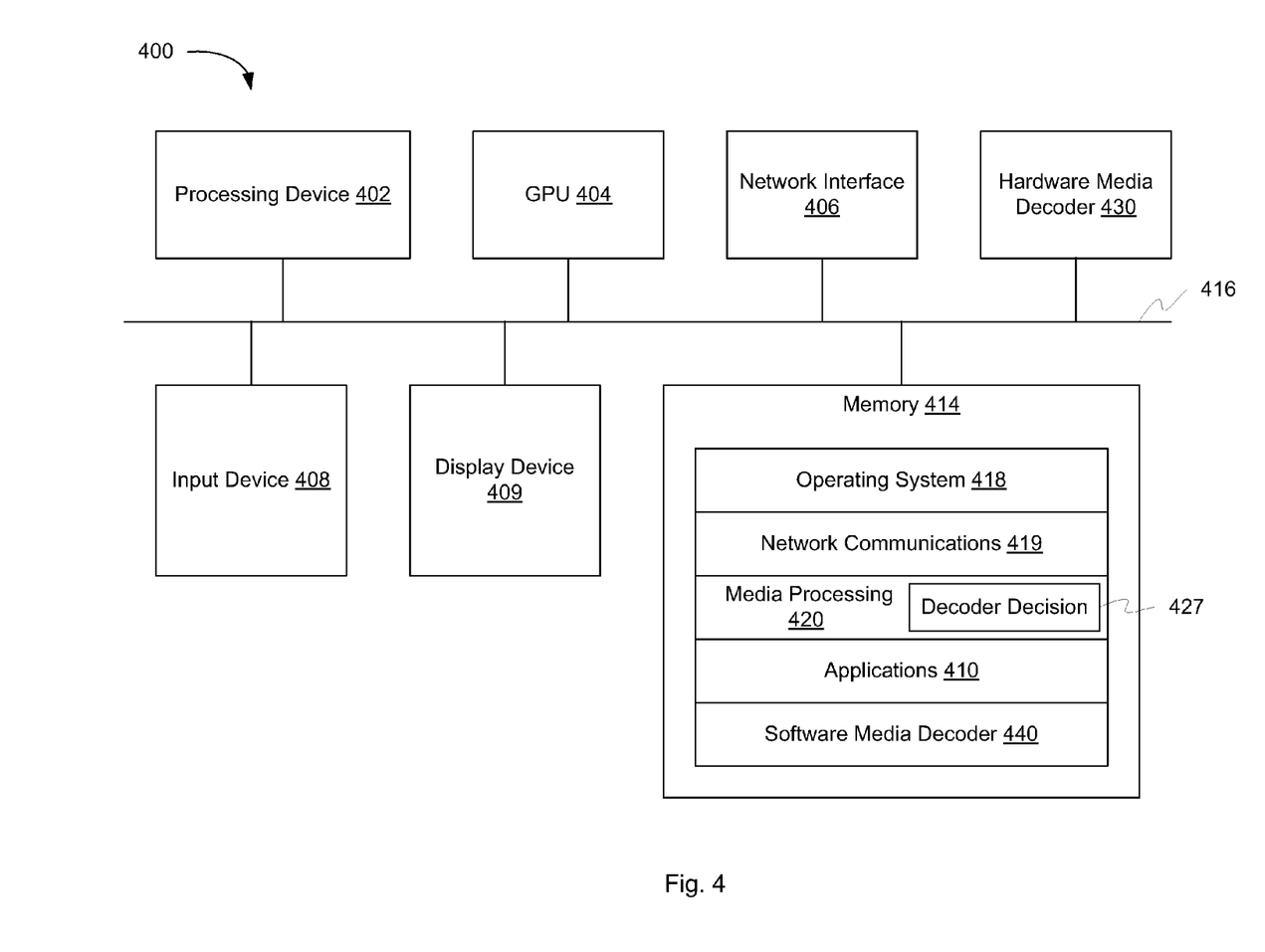
FIG. 4 is a block diagram illustrating a hardware architecture of a computing system according to an embodiment.

Client application 110 may be any program or set of instructions configured to be executed by a processor, such as processing device 402 shown in FIG. 4, of the computing device. Client application 110 may have the need to decompress media data as part of its operations. The media data may include image data, for example, in a number of image file formats such as JPEG, PNG, TIFF, or another image file format. Client application 110 may make use of the media decoding capabilities of the computing device on which it is running. In order to decode the media data, client application 110 may forward a request 112 to decode the media data to media processing software 120.

Media processing software 120 receives the request 112 to decode the media data and intelligently determines which of a plurality of media decoders would be most efficient to use in decoding the media data. In one embodiment, the plurality of media decoders includes hardware media decoder 130 and software media decoder 140. Media processing software 120 receives feedback 131 from hardware media decoder 130 regarding the operating status of hardware media decoder 130. The information in feedback signal 131 may include, for example, the type of media data that hardware media decoder 130 is configured to decode, the size of media data that hardware media decoder 130 is configured to decode, the current load on hardware media decoder 130, whether hardware media decoder 130 is functioning properly, or other limitations on hardware media decoder 130. In one embodiment, hardware media decoder 130 may be configured to decode JPEG image data. Media processing software 120 uses the feedback information 131 from hardware decoder 130 as well as information contained in the request 112 to intelligently determine which media decoder to use. This determination will be discussed further below.

Upon determining whether to use hardware media decoder 130 or software media decoder 140, media processing software 120 routes 122 the media data to the appropriate decoder. Either hardware media decoder 130 or software media decoder 140 performs decompression operations to decode the media data. The operations performed by hardware media decoder 130 and software media decoder 140 are well known in the art and are not described herein, so as not to obscure the present invention. The decoded media data is forwarded 132, 142 back to the client application 110. Client application 110 may forward the decoded media data to a rendering engine 150 where an image is rendered from the decoded media data according to known rendering techniques. The rendered image may be passed to a display 160, where the image is viewable by a user of the computing device.

Figure 2:
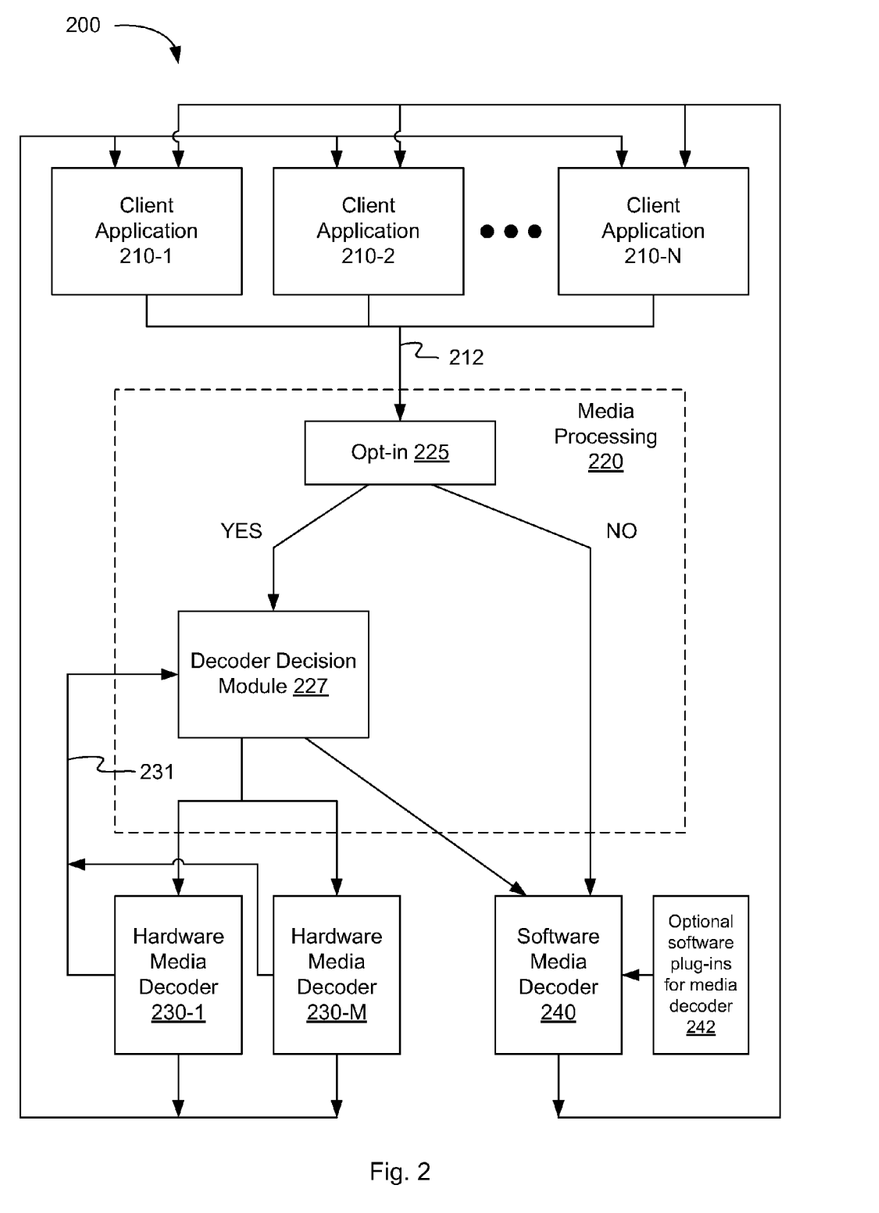
FIG. 2 is a block diagram illustrating the operation of a computing device, according to an embodiment.

FIG. 2 is a block diagram 200 illustrating the operation of a computing device, according to an embodiment. In this embodiment, the computing device includes a plurality of client applications 210-1-210-N. Any of client applications 210-1-210-N may make a request 212 of media processing software 220 to decode media data. The request 212 may include compressed media data to be decoded as well as metadata. The metadata may include information regarding the media data and/or the client application making the request. This metadata may be useful to media processing software 220 in deciding which decoder to use to decode the media data. In certain embodiments the metadata may include one or more of a file format of the media data, a size or resolution of the media data, and a current state of the requesting client application. The current state of the requesting application may be, for example whether the client application is a foreground or a background process executing on a processor.

The media data decoding request 212 is received by media processing software 220. In one embodiment, the request 212 is analyzed by opt-in block 225. The metadata in the request 212 may include an indication of whether the requesting client application 210-1-210-N has opted-in to the decoder decision method performed by media processing software 220. Opt-in block 225 recognizes this indication and forwards the request 212 to decoder decision module 227 if the opt-in indication is present in request 212. In one embodiment, if the opt-in indication is not present in request 212, opt-in block 225 forwards the request directly to software media decoder 240 if the default decoder is the software decoder. In another embodiment, if the opt-in indication is not present, opt-in block 225 forwards the request to a hardware decoder if the image or media has a certain format(s) (e.g., a JPEG format) and forwards the request to a software decoder for all other formats. In one embodiment, the software media decoder 240 may be optionally supported by software plug-ins 242 that can provide support to decode additional formats (e.g., those formats not supported by the hardware decoders). The option to opt-in to the decoder decision method may be either a default or user-configurable setting in the client application or may be set by the developer of the application.

If the request 212 has opted-in to the decoder decision method, the request 212 is forwarded to decoder decision module 227. Decoder decision module 227 uses the information from the metadata of the request 212 as well as feedback information 231 from hardware decoders 230-1-230-M to intelligently determine which media decoder to use. In one embodiment, there may be a plurality of hardware media decoders 230-1-230-M available to decode the media data, where each hardware decoder may have the same or different performance characteristics. For example, the hardware decoders may be able to decode media data having different file formats, or having different image sizes. The information in request 212 and feedback information 231 allows decoder decision module 227 to make the decision based on a number of factors, including but not limited to limitations of the hardware media decoders 230-1-230-M, the file format of the media data, the size of the media data, a current state of the requesting client application 210-1-210-N (e.g., whether the requesting client application is a foreground or background application in a user interface), and load balancing considerations. The decoder decision method performed by decoder decision module 227 will be discussed further below with respect to FIG. 3.

In one embodiment, the metadata included with media data decoding request 212 may additionally include information from the client application regarding a preferred media decoder or preferred performance characteristics. For example, the application making the request 212 may be able to specify that the decoder decision module 227 should optimize for power-consumption, speed, accuracy or other performance characteristics. Decoder decision module 227 may factor in the preferences specified by the client application when deciding which media decoder to use.

Once decoder decision module 227 has determined which of hardware media decoders 230-1-230-M and software media decoder 240 to use to decode the media data, the media data is forwarded to the appropriate media decoder. The selected media decoder decodes the media data and forwards the decoded media data back to the requesting client application. In one embodiment, the media decoder may pass information, including which media decoder was used, back to the client application along with the decoded media data. The client application may use this information for testing or debugging purposes. In another embodiment, the entire decoder decision method is transparent to the client applications.

Figure 3:
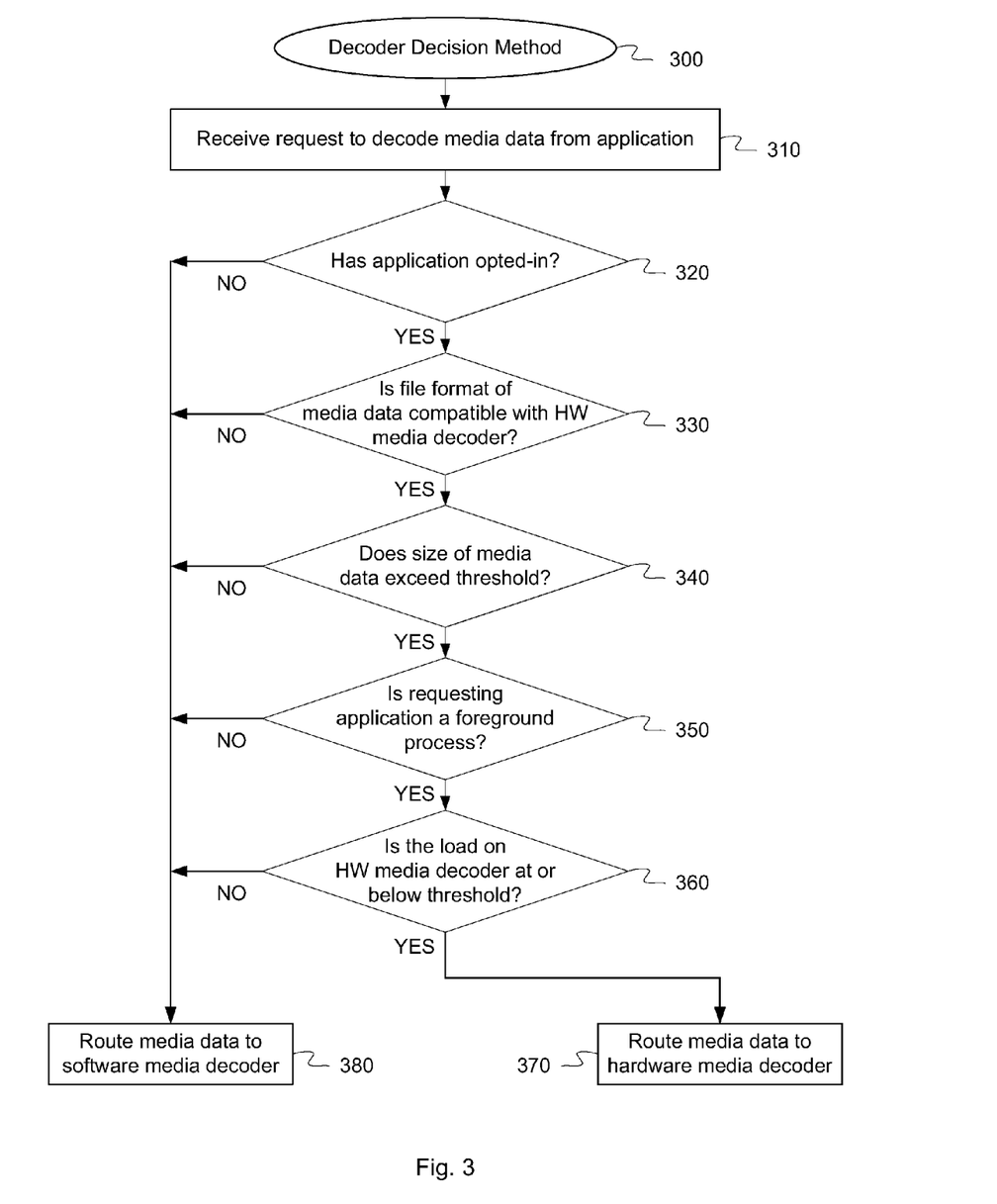
FIG. 3 is a flow chart illustrating an intelligent decoder decision method, according to an embodiment.

FIG. 3 is a flow chart illustrating an intelligent decoder decision method, according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to intelligently determine which of a plurality of decoders to use to decode a piece of media data based on a number of received factors. In one embodiment, method 300 may be performed by media processing software 220 and decoder decision module 227, as shown in FIG. 2.

Referring to FIG. 3, at block 310, method 300 receives a request to decode media data from a client application 210-1-210-N. At block 320 method 300 determines whether the request includes an indication that the requesting client application has opted-in to the decoder decision method 300 implemented by decoder decision block 227. In one embodiment, the indication may be in the form of a key value pair. If the request does not include the indication, either through omission or by a specific rejection of the decoder decision method 300, the media data specified in the request is routed to software media decoder 240 at block 380. If at block 320, the request includes the indication, method 300 proceeds to block 330.

At block 330, method 300 detects a file format of the media data and determines whether the media data is compatible with an available hardware media decoder 230-1-230-M. In one embodiment, the media data may include image data having an image file format such as JPEG, PNG, TIFF, or another image file format. The file format of the media data may be determined from metadata in the request received from the client application and the compatible file format types may be received from hardware media decoders 230-1-230-M through feedback 231. In one embodiment, where there is a plurality of hardware media decoders, there may be a plurality of compatible file format types. If the file format type does not match that of an available hardware media decoder, the media data is routed to software media decoder 240 at block 380. If at block 330, method 300 determines that the file format of the media data is compatible with that of an available hardware media decoder, method 300 proceeds to block 340.

At block 340, method 300 detects a size of the media data and determines whether the media data exceeds a predetermined size threshold. A hardware media decoder may have a set-up process that is performed before the hardware media decoder can decode media data. The set-up process may take up time and/or system resources. For media data representing an image of a given size, the costs in time and system resources associated with the set-up process of the hardware media decoder may outweigh any benefit obtained by using the hardware media decoder over a software media decoder. Accordingly, a threshold size may be set, where if the size of the media data does not exceed the threshold, the media data is routed to software media decoder 240 at block 380. In one embodiment, the predetermined threshold may be set by a designer or user of system, however in other embodiments, the threshold may be automatically set based on the characteristics of the hardware media decoders 230-1-230-M. If at block 340, method 300 determines that the size of the media data exceeds the predetermined threshold, method 300 proceeds to block 350. In another embodiment, a second threshold is set for the maximum size of an image that the hardware decoders 230-1-230-M are able to decode. Thus, if the size of the image exceeds the second threshold, the media is also routed to the software media decoder 240.

At block 350, method 300 detects a current state of the requesting application. In one embodiment, the state of the client application may be a foreground or a background process executing on a processor of the computing system. In a computing device running foreground and background applications, the case may occur where both the foreground and background applications are decoding media data. The background application may be importing or converting images, while the foreground application may be displaying content to a user of the computing device. Since a hardware media decoder typically offers faster performance than a software media decoder, method 300 gives priority to a request to decode image data from a foreground application. Thus, if the requesting application is a background application, the media data is routed to software media decoder 240 at block 380. If at block 350, method 300 determines that the requesting application is a foreground process, method 300 proceeds to block 360.

At block 360, method 300 detects a current load on hardware media decoders 230-1-230-M. In an attempt to balance the media data decoding load between hardware media decoders 230-1-230-M and software media decoder 240, a threshold may be set for the maximum allowable load on hardware media decoders 230-1-230-M. The threshold may be for example, a given number of decoding tasks in a queue waiting for the hardware media decoders 230-1-230-M to become available. In one embodiment, the threshold may be set by a designer or user of the system, however in other embodiments, the threshold may be automatically set based on the characteristics of the hardware media decoders 230-1-230-M. If the load on hardware media decoders 230-1-230-M exceeds the threshold, the media data is routed to software media decoder 240 at block 380. If at block 360, method 300 determines that the load on hardware media decoders 230-1-230-M is at or below a given threshold, the media data is routed to one of hardware media decoders 230-1-230-M at block 370.

In one embodiment, the decision at block 320 is optional and may not be included in method 300. In other embodiments of decoder decision method 300, the decisions made at blocks 330, 340, 350 and 360 may be made in any order. Additionally, any combination of one or more of the decisions made at blocks 330, 340, 350 and 360 may be included in method 300. Thus, in some embodiments, the media data may be routed to one of hardware media decoder 230-1-230-M at block 370 without making all of the decisions at blocks 330, 340, 350 and 360. Method 300 may proceed directly to block 370 after making an affirmative determination at any of blocks 330, 340, 350 or 360.

FIG. 4 is a block diagram illustrating a hardware architecture of a computing system 400 according to an embodiment. Computing system 400 may be any electronic device that runs software applications derived from stored instructions, including without limitation personal computers, servers, smart phones, media players, electronic tablets, game consoles, email devices, consumer electronic devices, or other devices. In one embodiment, computing system 400 may include one or more processing devices or processing cores 402, one or more graphics processing units (GPUs) 404, one or more network interfaces 406, one or more input devices 408, one or more display devices 409, one or more hardware media data decoders 430 and memory 414. Each of these components may be coupled together by one or more buses 416.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Additionally, processing device 402 may include any combination of general-purpose processing devices and special-purpose processing device(s). Processing device 402 is configured to execute instructions for performing the operations and steps discussed herein.

GPU 404 may include any known graphics processor technology, such as for example, NVIDIA™ GeForce™ processor technology. Input device 408 may include any known input device technology, including but not limited to an alphanumeric input device (e.g., a keyboard or virtual keyboard), a cursor control device (e.g., a mouse, trackball, touch-sensitive pad or display). Display device 409 may include any known display technology, including but not limited to video display devices using, liquid crystal display (LCD), light emitting diode (LED) or cathode ray tube (CRT) technology. Hardware media data decoder 430 may be similar to any of hardware media decoders 130 and 230-1-230-M, described above with respect to FIGS. 1 and 2. Bus 416 can be any known internal or external bus technology, including but not limited to ISA, EISA, PCI, PCI Express, NuBus, USB, Serial ATA or FireWire.

Memory 414 may include any storage medium that participates in providing instructions (e.g., software) embodying any one or more of the methodologies or functions described herein to processing device 402 for execution. Memory 414 may include high-speed random access memory and/or non-volatile memory, such as one or more magnetic disk storage devices, one or more optical storage devices, and/or flash memory (e.g., NAND, NOR). Memory 414, which may be an embodiment of a machine-readable storage medium, may include various instructions for implementing an operating system 418 (e.g., Mac OS®, Windows®, Linux). The operating system 418 may be multi-user, multiprocessing, multi-tasking, multithreading, real-time and the like. The operating system 418 may perform tasks, including but not limited to recognizing input from input device 408, sending output to display device 409, keeping track of files and directories on memory 414, controlling peripheral devices which can be controlled directly or through an I/O controller (not shown), and managing traffic on bus 416. Network communications instructions 419 can establish and maintain network connections (e.g., software for implementing communication protocols, such as TCP/IP, HTTP, Ethernet).

Media processing software 420 may include media processing instructions to facilitate media processing-related processes and functions, including the decoding of media data. Media processing software 420 may include decoder decision module 427 to intelligently determine which of a plurality of media decoders to route media data to for decompression, as described above with respect to FIG. 3.

Memory 414 can further store instructions for one or more applications 410. Applications may include but are not limited to telephony applications, electronic messaging applications, web browsing, applications, GPS/navigation applications, camera applications, and other applications. Software media decoder 440 may be used to decode compressed media data if characteristics of the media data are not compatible with an available hardware media decoder 430.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. In one embodiment, an API-calling component may access the decoder decision method described above. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component. The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 5:
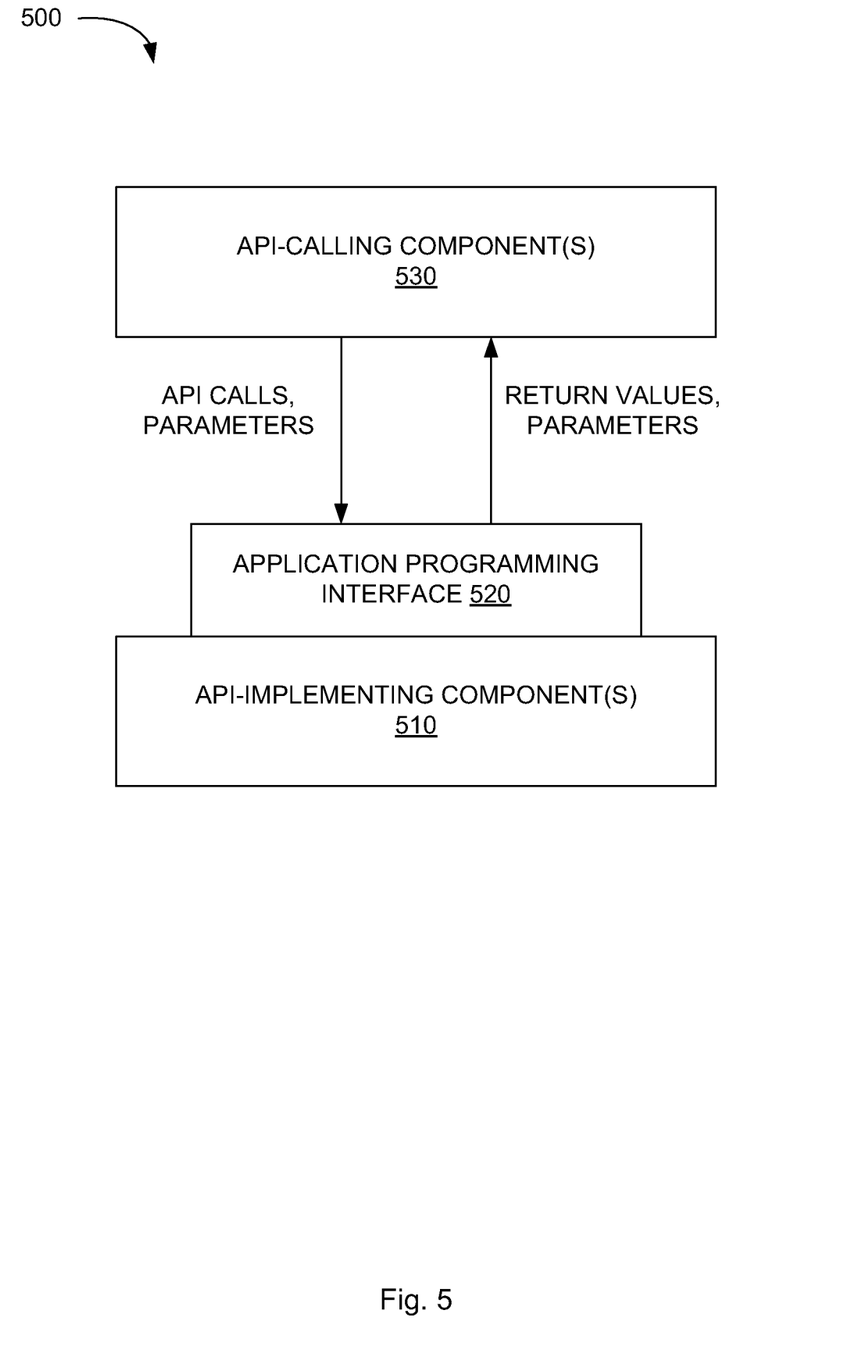
FIG. 5 is a block diagram illustrating an exemplary API architecture according to an embodiment.

FIG. 5 is a block diagram illustrating an exemplary API architecture, which may be used in some embodiments of the invention. As shown in FIG. 5, the API architecture 500 includes the API-implementing component 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component 530. In one embodiment, API-calling component 530 may access the decoder decision method described above. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

It will be appreciated that the API-implementing component 510 may include additional functions, methods, classes, data structures, and/or other features that are not specified through the API 520 and are not available to the API-calling component 530. It should be understood that the API-calling component 530 may be on the same system as the API-implementing component 510 or may be located remotely and accesses the API-implementing component 510 using the API 520 over a network. While FIG. 5 illustrates a single API-calling component 530 interacting with the API 520, it should be understood that other API-calling components, which may be written in different languages (or the same language) than the API-calling component 530, may use the API 520.

The API-implementing component 510, the API 520, and the API-calling component 530 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable non-transitory storage medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method, implemented by a computing device configured to perform the following, comprising:
   receiving a request to decode media data from an application, wherein the application is configured to participate in a decoder decision process;
   determining, in the decoder decision process, a state of the application;
   if the application is in a first state, routing the media data to a hardware media decoder if the hardware media decoder is capable of decoding the media data, otherwise,
   if the application is in the first state and the hardware media decoder is not capable of decoding the media data, routing the media data to a software media decoder; and
   if the application is in a second state, routing the media data to the software media decoder.

2. The method of claim 1, wherein the first state comprises a foreground process executing on a processor and wherein the method further comprises rendering an image derived from decoding the media data in one of the hardware and software media decoders.

3. The method of claim 1, wherein the second state comprises a background process executing on a processor.

4. The method of claim 1, wherein the media data comprises electronic image data.

5. The method of claim 1, further comprising:
   determining whether the hardware media decoder is capable of decoding the media data, wherein the determining includes:
   determining a file format type of the media data; and
   prior to routing the media data to the hardware media decoder or the software media decoder, if the file format type of the media data is a first file format type and the application is in the first state,
   concluding that the hardware media decoder is capable of decoding the media data, otherwise,
   concluding that the hardware media decoder is not capable of decoding the media data.

6. The method of claim 5, wherein the first file format type comprises JPEG compression.

7. The method of claim 1, further comprising:
   determining a size of the media data;
   prior to routing the media data to the hardware media decoder or the software media decoder, if the size of the media data exceeds a threshold value and the application is in the first state,
   routing the media data to the hardware media decoder, otherwise
   routing the electronic image data to the software decoder.

8. The method of claim 1, wherein the request to decode the media data comprises an indication from the application to intelligently route the media data to one of the hardware media decoder and the software media decoder.

9. The method of claim 8, further comprising:
   prior to determining the state of the application, if the request to decode the media data does not comprise the indication, exiting the decoder decision process and routing the media data to the software media decoder.

10. The method of claim 1, further comprising:
decoding the media data;
forwarding the decoded media data back to the application;
rendering an image from the media data; and
displaying the image.

11. The method of claim 1, further comprising:
determining a load on the hardware media decoder;
prior to routing the media data to the hardware media decoder or the software media decoder, if the load on the hardware media decoder is at or below a threshold value and the application is in the first state,
routing the media data to the hardware media decoder, otherwise
routing the electronic image data to the software decoder.

12. A system comprising:
a processing device which includes a processor;
a storage device coupled to the processing device and configurable for storing instructions, wherein the instructions configure the processing device to:
receive a request to decode media data from an application, wherein the application is configured to participate in a decoder decision process;
determine, in the decoder decision process, a state of the application;
if the application is in a first state, route the media data to a hardware media decoder if the hardware media decoder is capable of decoding the media data, otherwise,
if the application is in the first state and the hardware media decoder is not capable of decoding the media data, route the media data to a software media decoder; and
if the application is in a second state, routing the media data to the software media decoder.

13. The system of claim 12, wherein the first state comprises a foreground process executing on the processing device and wherein the instructions further configure the processing device to render an image derived from decoding the media data in one of the hardware and software media decoders.

14. The system of claim 12, wherein the second state comprises a background process executing on the processing device.

15. The system of claim 12, wherein the media data comprises electronic image data.

16. The system of claim 12, wherein the instructions further configure the processing device to:
determine whether the hardware media decoder is capable of decoding the media data, wherein the determine includes:
determine a file format type of the media data; and
prior to route the media data to the hardware media decoder or the software media decoder, if the file format type of the media data is a first file format type and the application is in the first state, conclude that the hardware media decoder is capable of decoding the media data, otherwise,
conclude that the hardware media decoder is not capable of decoding the media data.

17. The system of claim 16, wherein the first file format type comprises JPEG compression.

18. The system of claim 12, wherein the instructions further configure the processing device to:
determine a size of the media data;
prior to route the media data to the hardware media decoder or the software media decoder, if the size of the media data exceeds a threshold value and the application is in the first state,
route the media data to the hardware media decoder, otherwise
route the electronic image data to the software decoder.

19. The system of claim 12, wherein the request to decode the media data comprises an indication from the application to intelligently route the media data to one of the hardware media decoder and the software media decoder.

20. The system of claim 19, wherein the instructions further configure the processing device to:
prior to determine the state of the application, if the request to decode the media data does not comprise the indication, exit the decoder decision process and routing the media data to the software media decoder.

21. The system of claim 12, wherein the instructions further configure the processing device to:
decode the media data;
forward the decoded media data back to the application;
render an image from the media data; and
display the image.

22. A non-transitory computer readable medium comprising instructions which when executed by a computing device performs a method, the method comprising:
receiving a request to decode media data from an application;
determining if the application is a foreground or a background process;
if the application is a foreground process, routing the media data to a hardware media decoder if the hardware media decoder is capable of decoding the media data, otherwise,
if the application is the foreground process and the hardware media decoder is not capable of decoding the media data, routing the media data to a software media decoder; and
if the application is a background process, routing the media data to the software media decoder.

23. The medium of claim 22, further comprising:
rendering an image derived from decoding the media data in one of the hardware and software media decoders.

24. The medium of claim 22, wherein the media data comprises electronic image data.

25. The medium of claim 22, further comprising:
determining whether the hardware media decoder is capable of decoding the media data, wherein the determining includes:
determining a file format type of the media data; and
prior to routing the media data to the hardware media decoder or the software media decoder, if the file format type of the media data is a first file format type and the application is a foreground process,
concluding that the hardware media decoder is capable of decoding the media data, otherwise,
concluding that the hardware media decoder is not capable of decoding the media data.

26. The medium of claim 25, wherein the first file format type comprises JPEG compression.

27. The medium of claim 22, further comprising:
determining a size of the media data;
prior to routing the media data to the hardware media decoder or the software media decoder, if the size of the media data exceeds a threshold value and the application is a foreground process, routing the media data to the hardware media decoder, otherwise routing the electronic image data to the software decoder.

28. The medium of claim 22, wherein the request to decode the media data comprises an indication from the application to intelligently route the media data to one of the hardware media decoder and the software media decoder.

29. The medium of claim 28, further comprising:

prior to determining the state of the application, if the request to decode the media data does not comprise the indication, exiting the decoder decision process and routing the media data to the software media decoder.

30. The medium of claim 22, further comprising:

decoding the media data;

forwarding the decoded media data back to the application;

rendering an image from the media data; and displaying the image.

31. The medium of claim 22, further comprising:

determining a load on the hardware media decoder;

prior to routing the media data to the hardware media decoder or the software media decoder, if the load on the hardware media decoder is at or below a threshold value and the application is a foreground process, routing the media data to the hardware media decoder, otherwise routing the electronic image data to the software decoder.

\* \* \* \* \*